United States Patent
Twelftree

(10) Patent No.: US 9,982,795 B2
(45) Date of Patent: May 29, 2018

(54) MODULAR FLUID CONTROL SYSTEM

(71) Applicant: Martin Twelftree, Milton Keynes (GB)

(72) Inventor: Martin Twelftree, Milton Keynes (GB)

(73) Assignee: Parker Hannifin Manufacturing Limited, Milton Keynes (GB)

( * ) Notice: Subject to any disclaimer, the term of this patent is extended or adjusted under 35 U.S.C. 154(b) by 63 days.

(21) Appl. No.: 14/376,246

(22) PCT Filed: Feb. 1, 2013

(86) PCT No.: PCT/GB2013/050226
§ 371 (c)(1),
(2) Date: Aug. 1, 2014

(87) PCT Pub. No.: WO2013/114124
PCT Pub. Date: Aug. 8, 2013

(65) Prior Publication Data
US 2015/0000777 A1    Jan. 1, 2015

(30) Foreign Application Priority Data

Feb. 3, 2012    (GB) .................................. 1201986.5

(51) Int. Cl.
| F16B 13/00 | (2006.01) |
| F16K 27/00 | (2006.01) |
| F15B 13/08 | (2006.01) |

(52) U.S. Cl.
CPC ........ F16K 27/003 (2013.01); F15B 13/0817 (2013.01); F15B 13/0825 (2013.01); F15B 13/0839 (2013.01); F15B 13/0864 (2013.01); F15B 13/0878 (2013.01); F15B 13/0896 (2013.01); Y10T 137/87885 (2015.04)

(58) Field of Classification Search
CPC . F15B 13/0825; F15B 13/0817; F16K 27/003
USPC ........................................................ 137/884
See application file for complete search history.

(56) References Cited

U.S. PATENT DOCUMENTS

| 3,025,878 | A | * | 3/1962 | Hupp | ....................... E03C 1/042 |
| | | | | | 137/315.01 |
| 5,277,622 | A | * | 1/1994 | Liljenberg | .......... F15B 13/0817 |
| | | | | | 439/499 |
| 5,823,088 | A | * | 10/1998 | Frisch | ................. F15B 13/0817 |
| | | | | | 60/407 |
| 6,012,479 | A | * | 1/2000 | Fukushima | ........... F16K 27/003 |
| | | | | | 137/271 |
| 6,283,155 | B1 | * | 9/2001 | Vu | ......................... F16K 27/003 |
| | | | | | 137/884 |
| 7,316,244 | B2 | * | 1/2008 | Miyazoe | ............. F15B 13/0817 |
| | | | | | 137/271 |
| 8,196,609 | B2 | * | 6/2012 | Oya | ....................... C23C 16/455 |
| | | | | | 137/884 |

(Continued)

*Primary Examiner* — Craig Schneider
*Assistant Examiner* — Angelisa L Hicks
(74) *Attorney, Agent, or Firm* — Thomas G. Fistek

(57) ABSTRACT

A modular fluid control system comprised of a plurality of fluid control modules (11), each including a manifold portion (17), and a support element (14) to which the modules are mechanically fixed (12). The manifolds of adjacent units are pneumatically, but not mechanically, connected in order to communicate therebetween. In such an arrangement the modules can be removed from within an array without disturbing neighboring units.

19 Claims, 8 Drawing Sheets

(56) References Cited

U.S. PATENT DOCUMENTS

| | | | | |
|---|---|---|---|---|
| 8,985,153 | B2* | 3/2015 | Didier | F15B 13/0817 137/271 |
| 2001/0003289 | A1* | 6/2001 | Mead | F15B 13/0817 137/884 |
| 2002/0170609 | A1* | 11/2002 | Herinckx | H05K 7/1468 137/884 |
| 2003/0155025 | A1* | 8/2003 | Camozzi | F15B 13/0402 137/884 |
| 2003/0192607 | A1* | 10/2003 | Wigmore | F15B 13/0814 137/884 |
| 2004/0187943 | A1* | 9/2004 | Bennett | F16K 27/003 137/884 |
| 2006/0060253 | A1* | 3/2006 | Yoshida | F16K 27/003 137/884 |
| 2006/0185746 | A1* | 8/2006 | Doyle | F15B 13/0817 137/884 |
| 2013/0240074 | A1* | 9/2013 | Hartwig | C03B 9/3636 137/884 |

* cited by examiner

MODULAR FLUID CONTROL SYSTEM

This application is a national phase of International Application No. PCT/GB2013/050226 filed Feb. 1, 2013 and published in the English language, which claims priority to Great Britain Application No. 1201986.5filed Feb. 3, 2012, both of which are incorporated herein by reference in their entirety.

TECHNICAL FIELD

The present invention relates to a modular fluid control system for controlling the flow of fluids (gases and/or liquids).

BACKGROUND ART

Connection of multiple valves using pipes (refer to prior art FIG. 1) in a fluid control system is widely used but is labour intensive and prone to leaks. More complicated systems take up a lot of space and are difficult to maintain.

Valve manifolds (refer to prior art FIG. 2) are widely used to avoid the problems above but are heavy, expensive to design and make, often require individual design for each configuration and are often severely limited in the number of valves and complexity of circuit that may be formed.

Prior art modular manifold or valve systems must be fixed together rigidly to provide a leak free fluid connection or require a piped or other flexible connection that introduces space, time and cost to the design and thereby negates much of the advantage provided by the manifold.

Where a large number of connections are required to the outside of an enclosure or to another device; alignment of all of the ports may be problematic with a modular design due to the accumulation of tolerances between components; this typically requires pipework to take up the variation in position which introduces cost and complexity as above.

Furthermore, the addition of an electronically controlled valve to control a piloted valve increases the cost, which is particularly the case for ATEX explosion proof designs.

DISCLOSURE OF THE INVENTION

The present invention seeks to address the shortcomings identified in the prior art and thereby provide a modular fluid control system that minimises or does not require piping or separate manifolds.

In a broad aspect the invention provides a modular fluid control system comprised of a plurality of fluid control modules, each including a manifold portion, and a support element for supporting the modules; whereby the plurality of modules can be arranged to be mechanically fixed to the support element, while said manifold portions are in mutual pneumatic connection.

Preferred embodiments of the invention provide a modular, self-manifolding (valve) system to provide varying configurations of grid arrays of valves which do not require rigid connection to form circuits, thereby avoiding the need for complicated pipework or manifolds and reducing size, complexity, cost and maintenance.

"Self-manifolding" in the context of the invention is interpreted as the requirement of the fluid control modules to have an integral manifold passage for directing fluid to an adjacent unit, i.e. so it does not require an additional/external manifold component.

The present invention provides a compact, robust, light weight, configurable, scalable system whereby large numbers of valves may be cheaply manufactured, connected, controlled and maintained.

MODES FOR CARRYING OUT THE INVENTION

Figure 1:
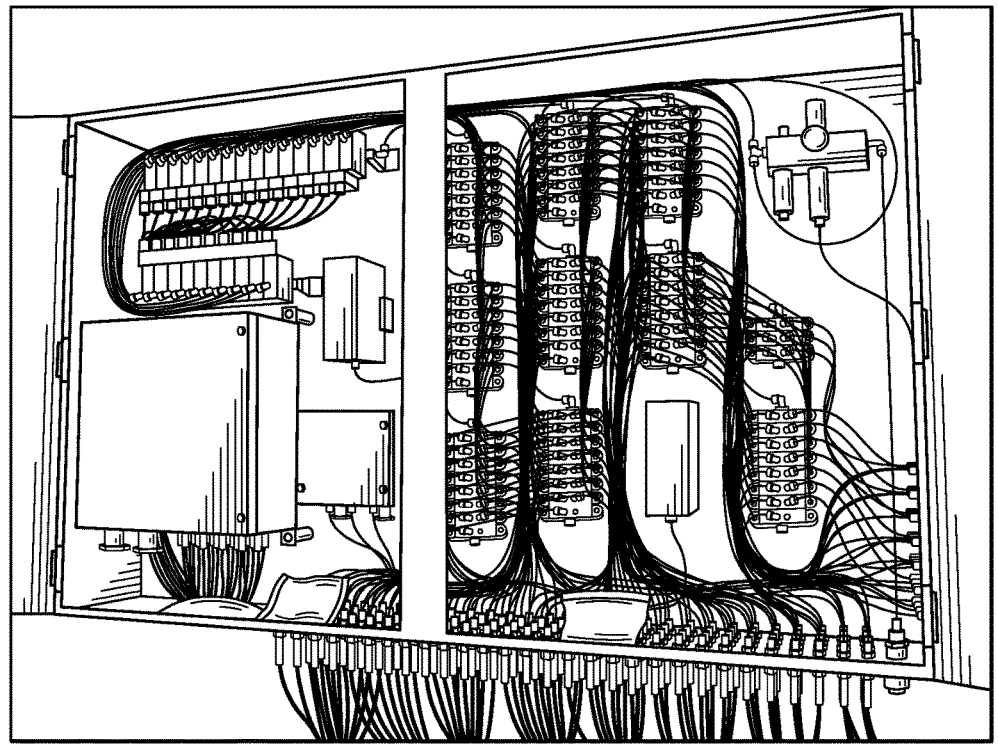
FIGS. 1 and 2 illustrate prior art examples of fluid control system components.
Figure 2:
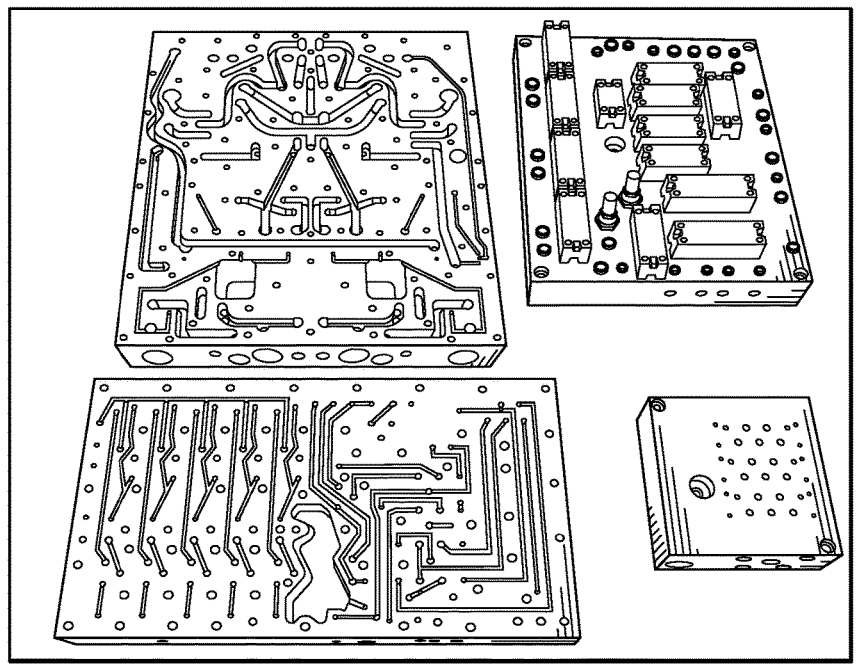
Figure 3:
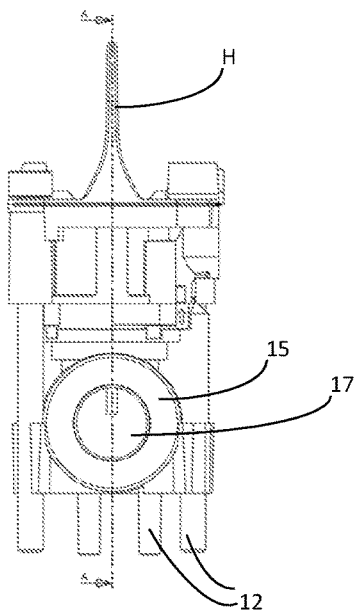
FIGS. 3 and 4 illustrate side and cross section views of a modular fluid control system according to the invention.
Figure 4:
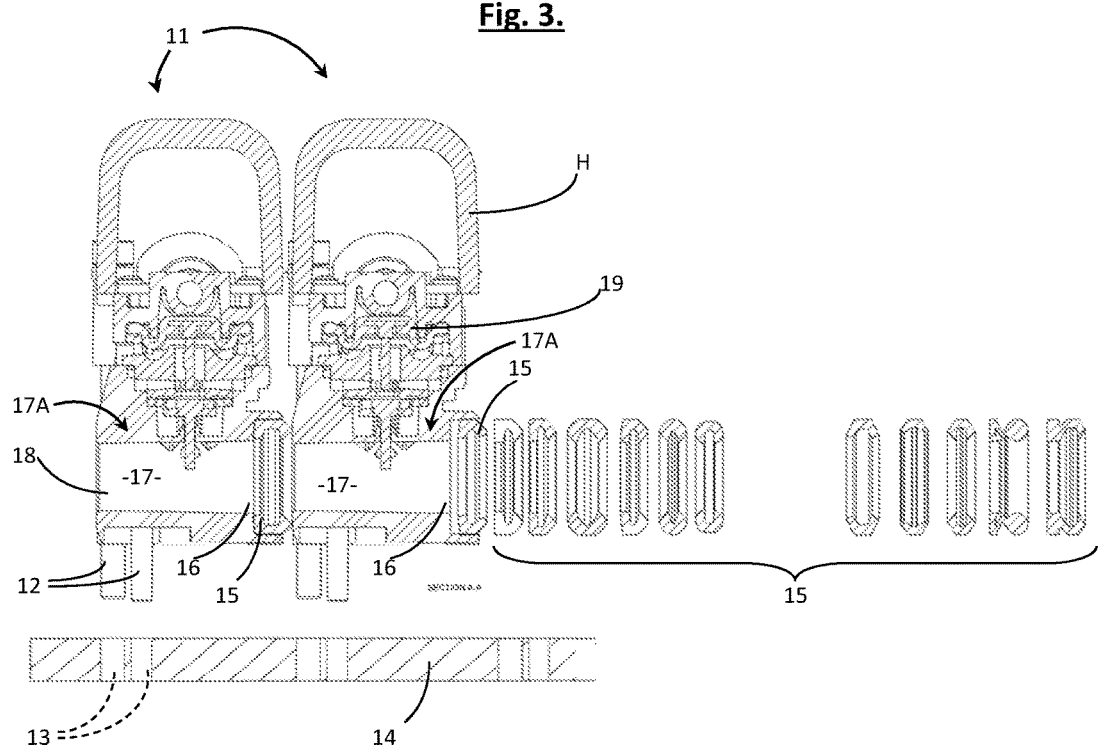

FIGS. 3 and 4 illustrate a self manifolding valve connection system according to the invention that is able to form an array of two or more modular units whereby the valve or unit serves as a manifold to deliver fluid media to adjacent valves or units. Alternatively or in addition, it may receive fluid media from adjacent valves or units to allow its operation.

Each modular unit 11 includes a coupling means 12 extending from an underside (insertion end) surface to be received by an opening 13 in support element/mounting plate 14 and fixed in place by a suitable means. Each modular unit 11 has a manifold portion 17A, which includes a seal 15, a first open end 16, a manifold passage 17, and a second open end 18. It will be noted that each modular unit 11 is in close proximity with an adjacent unit but not mechanically fastened. However, due the close proximity between units 11, a seal 15 at a first open end 16 of a manifold passage 17 seals against the second open end 18 of a neighbouring module 11. In this way a through passage is formed between units. In alternative forms, the male portion of the coupling may extend from the plate 14 to be received by a corresponding opening in the unit 11.

In the illustrated form of the invention, each unit 11 has a pull handle H extending from a topside surface such that a unit 11 could be easily pulled from an assembled array, once the coupling 12 is unfastened. Preferably the configuration may include a supply module comprising a valve, sensor and filter as noted hereinafter. Such a component can also be mechanically fastened to the mounting plate 14 and be arranged for pneumatic communication with adjacent components.

FIGS. 3 and 4 illustrate a simple through-passage 17, however, modular units 11 may be provided with different internal pathways, so long as an outlet is able to align with the inlet of a neighbouring unit.

Figure 5:
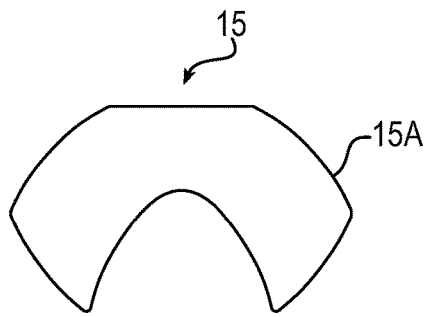
FIG. 5 illustrates a detailed view of a seal cross section.

By way of example, FIG. 5 illustrates a cross section of a preferred seal 15, which is one of many possible shapes as shown in FIG. 4. Seal 15 preferably has a contact face 15A with an angle/curve to facilitate the seal folding, rather than jamming against an adjacent module, during insertion/removal. A suitable shape, in combination with the material of construction, enable a good seal to be maintained such that a pneumatic connection is established between modules without leakage.

Fluid media within the system may supply fluid force to operate a valve 19, to allow piloting of the valve. This is commonly known in the industry as a pilot supply. Alternatively or in addition, supplied media may be the output media of the valve to provide motive force for an external device or supply said media externally. The pilot media may be the same fluid and/or pressure as the output media or may be a different pressure or a different media such as a liquid rather than a gaseous media.

The array of self manifolding valves and other units may comprise a number of complementary configurations which may have the pilot supply or output supply or both pilot and output supply paths fed through any adjacent face of adjacent valves. The valve may therefore be self-manifolding through one or two or three or more channels which may be fed from the same or from different axes and faces of the valve.

Said units will be referred to herein as "modules", "self manifolding valves", "self manifolding units" or simply "units" as the present invention comprises self manifolding valves but includes a range of other configurations. However, the exact configuration and purpose of the array of valves in the control system is peripheral to the invention.

To reduce manufacturing costs and allow a greater range of functionality, the same or similar body sections may be employed with differing internal components or differing flow paths between ports.

The modules may incorporate, within the same or similar body sections, a variety of functions/components commonly used in fluidic devices. Examples of such options include:

Electromagnetically operated valves
One or two or more electromagnetically operated pilot valves in combination with other valves such as 2/2 poppet valves, 3/2 poppet valves
Shuttle valves—also known as "OR" valves
Filters
Dehumidifiers
Pressure sensors
Flow sensors
Humidity sensors
Pressure regulators
Flow regulators
Back pressure valves
Back pressure regulators
Restrictors
Non return valves
Flow controllers Further functions may be usefully employed within alternative embodiments of the present invention.

As previously mentioned, the stated aims of the present invention are to reduce cost and/or leak paths and/or complexity and/or exposed surfaces and/or assembly time and or size and/or weight and/or reliability and/or environmental resistance. This is achieved through a simplified modular construction.

Figure 6:
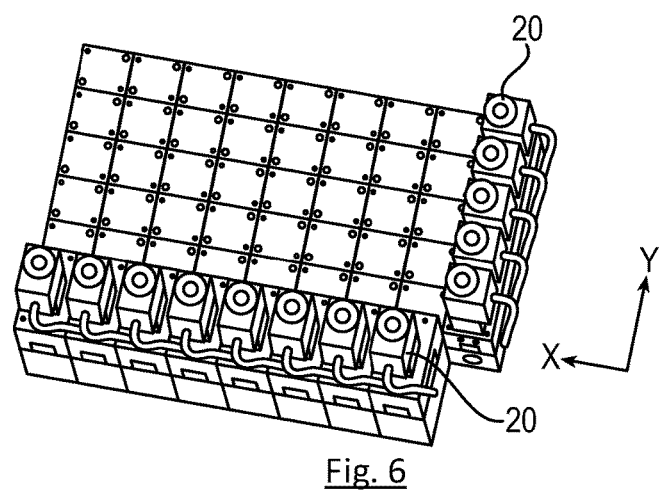
FIG. 6 illustrates a general view of an array for a modular fluid control system according to the invention.

One embodiment of the present invention, as illustrated by FIG. 6, is a two dimensional array of valves which are to be assembled on an X by Y grid in which there are one or more rows and one or more columns of output valves and a solenoid valve 20 at one end of each row or column.

Each row is controlled by a single pilot solenoid valve and each column is supplied by a single supply solenoid valve. A supply unit (denoted numeral 53 in FIG. 14) may provide fluid media to each bank of solenoid valves which will in turn provide fluid media to the remainder of the array.

Alternatively or in addition the supply unit may incorporate a pressure sensor to determine the presence of high pressure in the supply and on the output of one or more solenoid or pilot operated valve units.

Alternatively or in addition the supply unit may provide filtration of the fluid media to the solenoid pilot units to improve the resistance to contamination or otherwise protect them from particulate or droplet ingress.

One example of the embodiment noted above may comprise a grid of eight by ten output valves forming an array of 80 "normally closed" output valves with 8 columns of output valves, each comprising ten valves.

In this example a single solenoid valve supplies fluid media to each of the columns and a single solenoid valve supplying fluid pilot pressure may operate each row of valves. In effect there are eight supply valves and ten pilot valves controlling eighty output valves.

Each of the eight "supply" solenoid valves supplies a column of ten output valves and may be switched on and off by electrical means to allow the supply of media or to shut off the supply of media for that column of valves.

Each of ten pilot solenoid valves may supply a row of eight output valves and may be switched on and off by electrical means to allow the supply of fluid pressure or to shut off the supply of fluid pressure for that row of valves. The fluid pressure would act to open and close all of the output valves in that row.

A channel supplying fluid media from a supply solenoid valve may be considered as flowing in parallel to the y axis to supply all valves in that column of output valves. Each pilot solenoid valve may be considered as supplying fluid pressure to all output valves in that row of output valves. The fluid pressure in this example is applied along an axis in parallel to the x axis and causes all valves in that row to open.

According to this example an output flow or pressure from an output valve will only occur if both media is supplied to said valve and a pilot signal is applied to said valve to operate said valve. In this example, any single valve in the array may be operated by the operation of the supply solenoid valve for that column and the pilot solenoid valve for the row that the valve sits in.

It may be seen that the arrangement of valves is not limited to a grid array and that self manifolding solenoid valves may be used as an array of solenoid valves without the use of separate output valves. Such an array of valves may be termed a one dimensional array or a line of self manifolding valves and may comprise two or more valves connected together and supplying fluid media to and/or receiving fluid media from adjacent valves without the need for a manifold or separate supply of fluid media.

The example of a single line of valves may use a single common supply of fluid media to both provide fluid pressure to operate the valve and to provide output pressure and/or flow from the valve. Alternatively the single line of valves may use a supply of one fluid media to provide fluid pressure to operate the valve and a separate channel of fluid media to provide output media from the valve.

All configurations of self manifolding units and self manifolding valves are generally considered within the scope of the present invention as it can be seen that the number of valves in the array does not alter the core concept of the units having a self manifolding function.

It will be apparent that further channels may be provided within an array of two or more self manifolding valves to provide additional functionality. One example of an additional channel provided in a self manifolding valve is that of feedback from the valve. In one embodiment, a shuttle valve is provided in each or any solenoid valve or in each or any output valve, to provide a means by which the outputs may be monitored.

A shuttle valve or "OR" valve is a device that provides an output when one or both of the inputs experiences high pressure. This device can be likened to an electrical "OR gate" but works with liquid or gaseous fluid pressure. A high pressure input is transferred to the output channel without significantly affecting the other input channel. This is a well known function of an "OR valve" and of an "OR gate"

In this embodiment of the invention, a shuttle valve provides a means by which the output from the solenoid valve or output valve is able to pressurise the output channel in one direction without substantially influencing the pressure in the other direction down the channel. By this means, if any monitored valve provides an output, a high pressure signal will be observed on the output channel.

In such an embodiment of the present invention, a single pressure sensor may monitor all outputs from all valves without the valves interfering with each other.

An alternative embodiment of the present invention may require separate monitoring of certain banks of valves and/or of certain rows of valves and/or of certain groups of valves not defined by row or column grouping. An example of this embodiment may have three output channels labelled A, B and C with three pressure sensors. All pilot valves from this array of self manifolding valves may be connected to channel a and any of said pilot valves operating and thereby providing a high pressure output will pressurise channel A and provide a sensor output on the sensor connected to channel a. A separate sensor connected to channel B may monitor the operation of all output valves which are connected via "OR valves" to channel B. The third pressure sensor connected to channel C may in this example monitor the output of all supply valves and thereby give a signal identifying if any of the supply valves are providing fluid media to any of the output valves.

The use of more than one monitoring channel and the selection and grouping of monitoring channels will provide the ability to group and monitor a number of discreet valves whilst minimising the number of sensors required.

An alternative example may use a different number of monitoring channels from 1 to the number of valves present in the array including the solenoid valves. Any output that may be monitored by the presence or absence of pressure may be monitored by the use of shuttle/"OR" valves by this means.

Alternatively or in addition; self manifolding modules may be used on simple extruded manifolds or bespoke complex manifolds to provide additional functionality or ease of fitting or cost benefits via simplification of the manifold requirement. In other words, there are a variety of options for the support element upon which the modules are mounted.

Alternatively or in addition, self manifolding modules may have connections via tubing on one or more faces to allow further complexity or connections to said modules.

Alternatively or in addition the self manifolding modules may be supported by a DIN rail replacing the back plate as the support element for the modules and serving to lock the modules together in a one-dimensional (straight line) array. Pneumatic connection between the modules is otherwise maintained.

Figure 7:
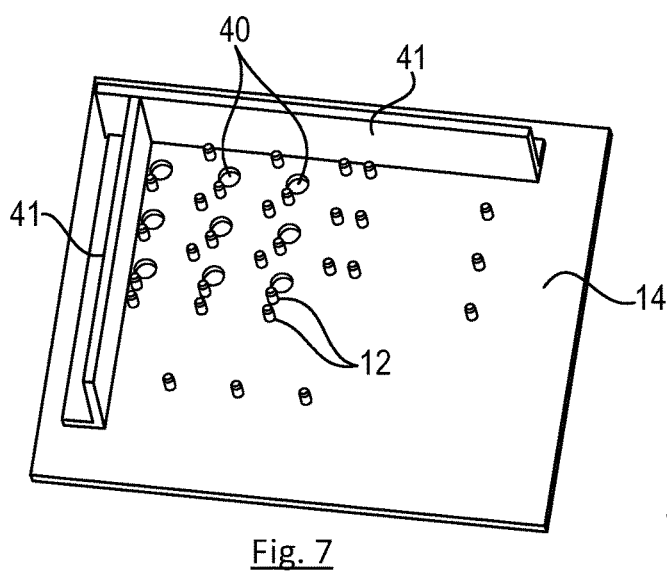
FIGS. 7 and 8 illustrate views of a support element.

Further embodiments and preferred features of the invention are illustrated in the accompanying drawings, wherein:

FIG. 7 illustrates an isometric view of a back plate 14 comprising a support element for the modules (not seen in this Figure), showing locating/retaining pins (that function as coupling mechanism 12) for retaining the modules and holes 40 for air flow from valves. Simple end plates 41 may be provided to blank off open ports from the modules.

Figure 8:
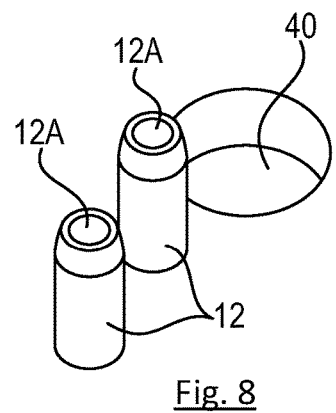

FIG. 8 illustrates an isometric close up view of the tapered pins 12, each with a threaded hollow section 12A for receiving a retaining screw.

Figure 9:
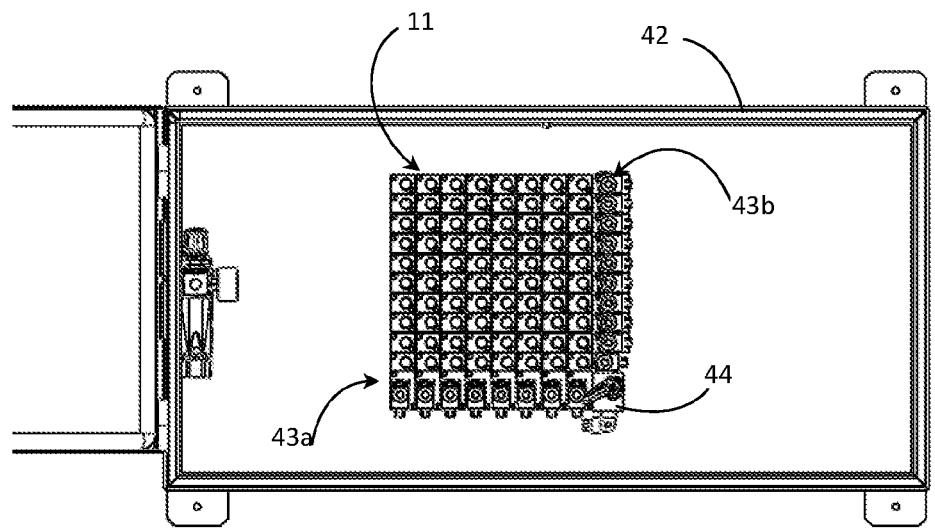
FIGS. 9 to 12 illustrate further examples of components for a modular fluid control system according to the invention.

FIG. 9 shows a front view of a cabinet 42 with an array of air operated self manifolding valves 11, piloted self manifolding valves 43a, 43b and a combined distribution and sensor self manifolding module 44.

Figure 10:
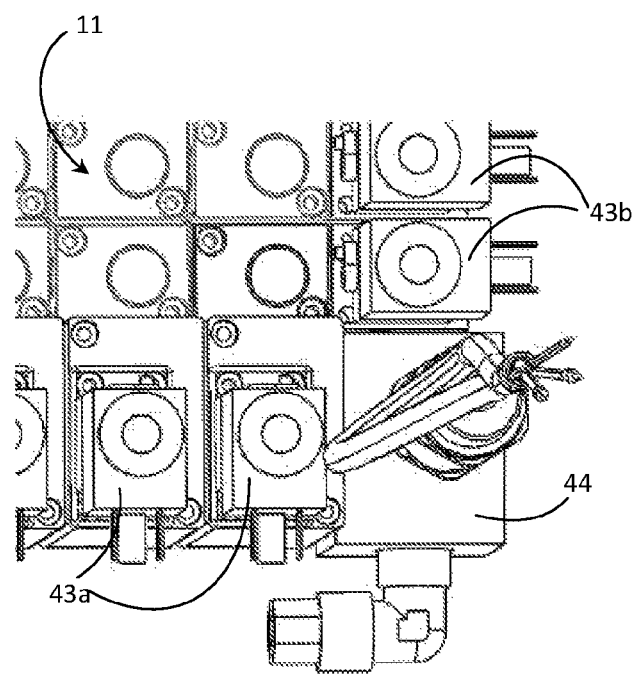

FIG. 10 is a close up view showing a combined supply and sensor module 44 (without a built-in valve) on the bottom right, two sets of large and a small solenoid piloted valve modules 43a, 43b on the bottom and right of the image respectively and some air operated air piloted valve modules 11, comprising part of the array shown in FIG. 9.

Figure 11:
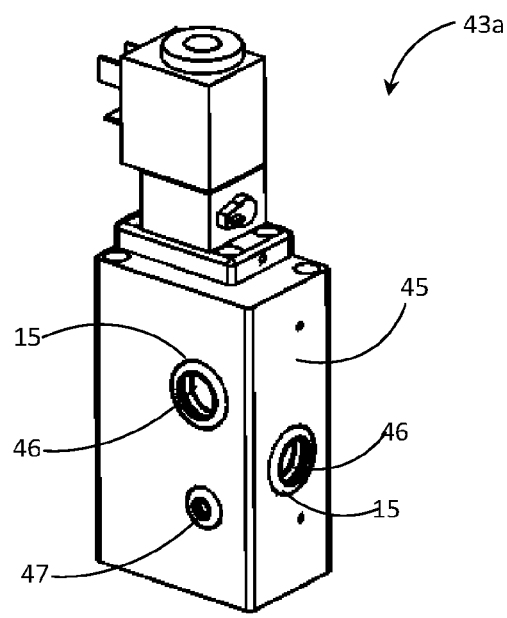

FIG. 11 shows an isometric view of a larger solenoid operated valve module 43a adapted from a standard valve design for use as a self manifolding module by the addition of a manifold element 45, additional ports 46, a through bore 47 to transfer air, locating holes on the base (not shown) and bespoke seals 15 to allow connection and easy fitting and removal within an array.

Figure 12:
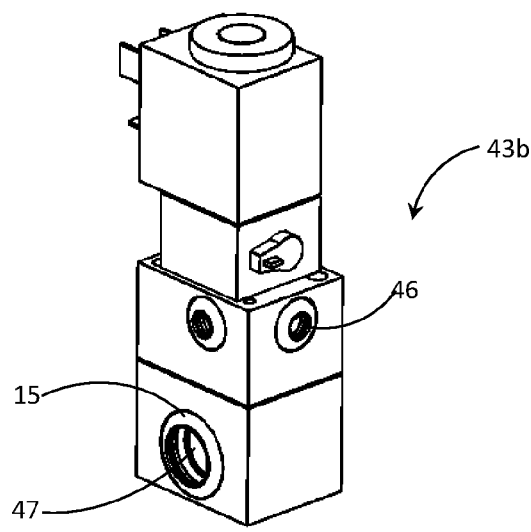
Figure 13:
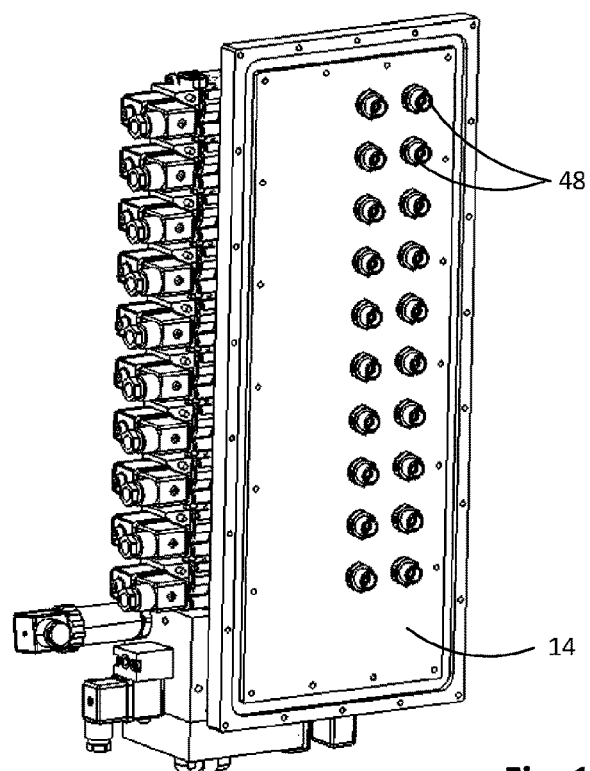
FIGS. 13 to 16 also illustrate further examples of components for a modular fluid control system according to the invention.
Figure 14:
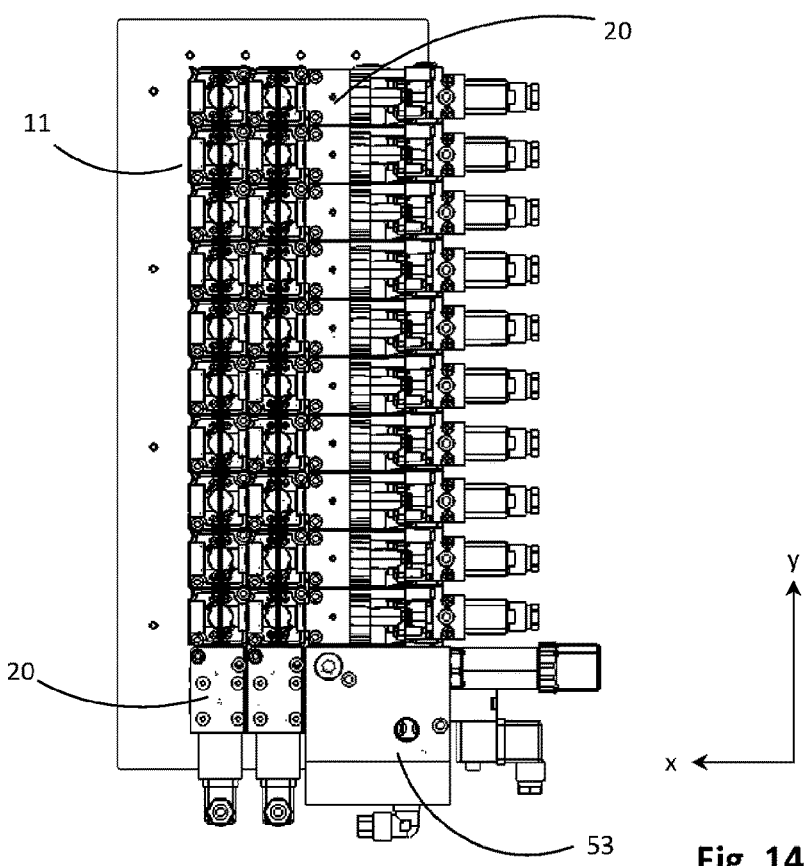

FIG. 12 shows an isometric view of a smaller two part moulded, bespoke self manifolding valve module 43b with separate supply and pilot ports 46, 47 and seals 15;

FIG. 13 is a valve plate assembly with pneumatic outputs 48 visible underneath the support element 14. Meanwhile, FIG. 14 illustrates a grid array: X by Y grid of output valves 11 with solenoid control valves 20 at the edge of the array. The self manifolding module to the bottom right preferably includes valve sensor and buffer volume functionality.

Figure 15:
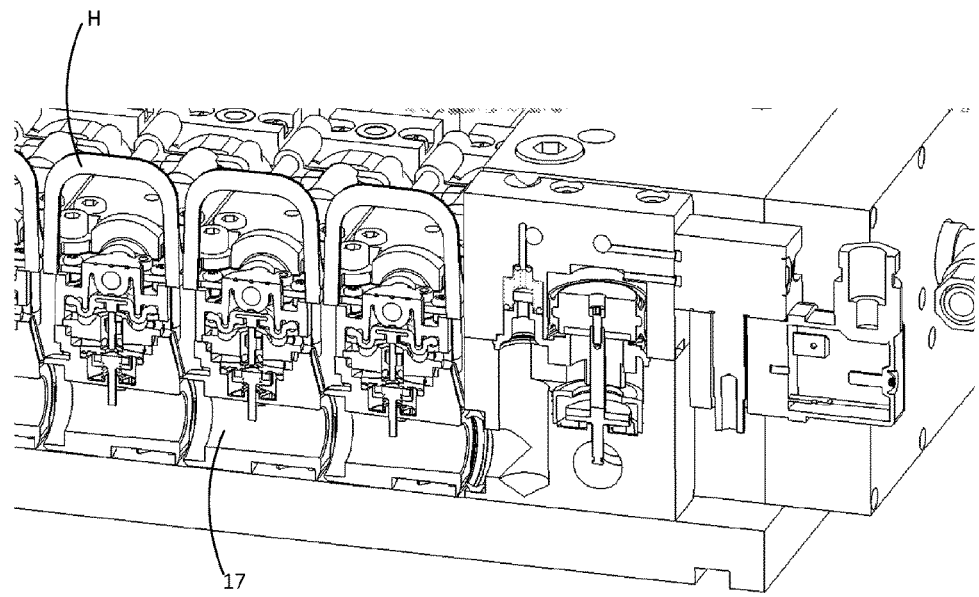

FIG. 15 illustrates an array of units 11 (as in FIG. 4) in section view, showing a larger supply valve module with logical or gate shuttle valve to top left of supply valve. Additional functionality is thereby incorporated into the supply module.

Figure 16:
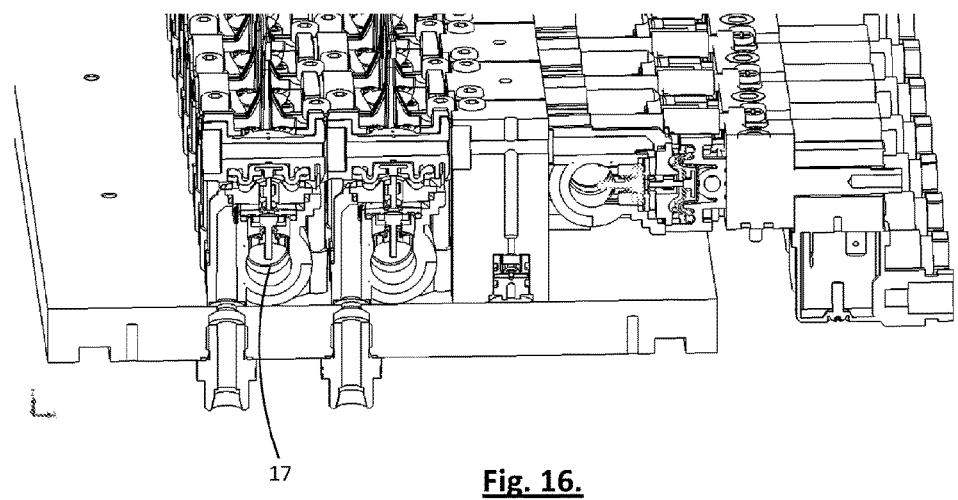

FIG. 16 shows a cross section showing a connection bore from pilots to output valve modules. It is noteworthy that the connection to the base could also use the same type of seal 15 as previously described.

Figure 17:
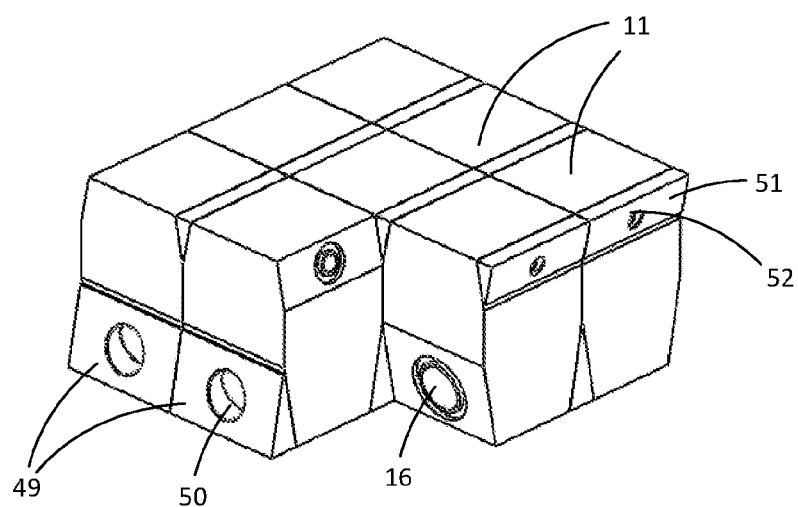
FIG. 17 illustrates an assembly of modular units.

FIG. 17 illustrates a further embodiment of the invention where the modular units 11 are in pneumatic communication by virtue of an intermediate V or wedge shaped connector block 49. In the illustrated form the connector block 49 is an upstanding wedge shape which may be fixed to the support element (not illustrated). An opening 50 extends through the flat face of wedge 49 such that openings 16/17 in the units 11 can communicate. Seals 15 may be located on the unit opening or on the wedge. The angle of the wedge contacting to a corresponding slope at the insertion end of a unit 11 can generally result in a compression which enables a better seal than the "straight" wall embodiment of FIG. 4. Furthermore, standard o-rings can be utilised rather than a more complex seal cross section designed to avoid folding during insertion.

The tapered nature of an upstanding wedge enables individual units 11 to be removed from within an array, assuming a coupling mechanism underneath said unit 11 is disconnected from the base.

It will be apparent that analogous wedge connectors 51 may be employed to form communication channels 52 between upper sides of a unit 11. In the illustrated form these are smaller shapes but several variations are possible. Connectors 51 may be held in place by a clamp arrangement or other suitable fixing means.

It will be apparent that the smaller V shaped blocks 51 would need to be removable to allow removal of the valves, while the lower/larger connectors 50 could fit to the mounting plate or be separately removable as necessary. Such an arrangement is in keeping with the "building block" nature of the invention.

INDUSTRIAL APPLICABILITY

It will be apparent that all components described herein can be manufactured from available materials according to cost considerations and performance requirements.

The invention claimed is:

1. A modular fluid control system comprising:
a plurality of fluid control modules that each include a manifold portion and a first coupling element;
a support element having a planar surface for supporting the plurality of fluid control modules, the support element having a plurality of second coupling elements having an axis that is perpendicular to the planar surface, wherein respective first and second coupling elements are axially aligned to allow the fluid control modules to be perpendicularly mounted and mechanically fixed to the planar surface; and
wherein at least one of the plurality of fluid control modules includes a face sealing element associated with its manifold portion and an adjacent fluid control module has a flat face, and the manifold portions of adjacent fluid control modules are in mutual fluidic connection via a fluid tight face seal formed by contact between the face sealing element of one fluid control module against the flat face of the adjacent fluid control module.

2. The modular fluid control system of claim 1 wherein the support element comprises a plate element that is configured to support a two dimensional array of fluid control modules.

3. The modular fluid control system of claim 1 wherein the support element includes one or more ports for establishing fluid connection with the fluid control modules.

4. The modular fluid control system of claim 1 wherein the support element includes a plurality of locating elements for locating the fluid control modules on the support element.

5. The modular fluid control system of claim 1 including a plurality of fixing elements for fixing the fluid control modules to the support element.

6. The modular fluid control system of claim 1 wherein the plurality of fluid control modules include one or more valve modules and/or "OR valves".

7. The modular fluid control system of claim 6, including at least one fluid piloted valve module.

8. The modular fluid control system of claim 6, including at least one solenoid operated valve module.

9. The modular fluid control system of claim 1, wherein the support element comprises a linear element that is configured to support a one dimensional array of fluid control modules.

10. A planar mounting plate configured for use with the modular fluid control system according to claim 1.

11. A modular fluid control system according to claim 1, wherein the plurality of fluid control modules are in the form of a grid array of self manifolding valves utilising a supply valve per column and a pilot valve per row whereby any column or set of columns in the grid is configured to be selectively supplied with fluid media from a supply valve or valves on that column or on those columns; and
any row or set of rows is configured to be selectively energised by a pilot valve or valves thereby providing an output coordinate to a single valve or subset of valves in the grid.

12. A modular fluid control system according to claim 11 further comprising a termination module incorporating visible indication of operation of supply to a self manifolding valve in the self manifolding valve array so as to demonstrate to an observer the presence of air or fluid pressure applied by a control valve to one or more pilot or supply paths within the grid array or line or group of valves.

13. A modular fluid control system according to 11 wherein a self manifolding valve in the self manifolding valve array comprises configurable or alternative inlet/outlet ports to allow the transfer of fluid media to or from different faces of said self manifolding valve thereby allowing the piloting of one configuration of valve by another configuration of valve.

14. A modular fluid control system according to claim 1 further comprising a module used to redirect flow without a valve, by use of a connector piece or branched T piece.

15. A modular fluid control system according to claim 1 comprising an array of fluid control modules.

16. The modular fluid control system of claim 1, wherein the first coupling element comprises a male portion and the second coupling element comprises a female portion.

17. A modular fluid control system comprising:
a plurality of fluid control modules that include a manifold portion, a face sealing element associated with its manifold portion, and a sloped portion;
an intermediate connector element located between adjacent fluid control modules to facilitate fluidic connection, the intermediate connector element comprising a wedge shape with a flat face and an opening therethrough, wherein the sloped portion of at least one fluid control module accommodates the wedge shape; and
wherein the manifold portions of adjacent fluid control modules are in mutual fluidic connection via a fluid tight face seal formed by contact between the face sealing element of one of the fluid control modules against the flat face of the intermediate connector element.

18. The modular fluid system of claim 17, wherein the plurality of fluid control modules include a first coupling element, and
further comprising a support element having a planar surface for supporting the plurality of fluid control modules, the support element having a plurality of second coupling elements having an axis that is perpendicular to the support element, wherein respective first and second coupling elements are axially aligned to allow the fluid control modules to be perpendicularly mounted and mechanically fixed to the planar surface.

19. The module fluid system of claim 18, wherein the intermediate connector element comprise a second a flat face and an opening therethrough, wherein the manifold portions of adjacent fluid control modules are in mutual fluidic connection via a fluid tight face seal formed by contact between the face sealing element of a second fluid control module and the second flat face of the intermediate connector element.

* * * * *